(12) United States Patent
Manalo

(10) Patent No.: US 6,502,562 B1
(45) Date of Patent: Jan. 7, 2003

(54) METHOD AND APPARATUS FOR REFORMING GAS VAPORS OF AN INTERNAL COMBUSTION ENGINE

(76) Inventor: Romeo L. Manalo, 2230 Roxas Blvd., Unit 1709, Pasay City Metro Manilla 1300 (PH)

(*) Notice: Subject to any disclaimer, the term of this patent is extended or adjusted under 35 U.S.C. 154(b) by 0 days.

(21) Appl. No.: 10/007,001

(22) Filed: Nov. 30, 2001

(51) Int. Cl.$^7$ .............................................. F02M 27/04
(52) U.S. Cl. ...................................... 123/536; 123/572
(58) Field of Search ................................. 123/536, 537, 123/538, 572, 573, 574

(56) References Cited

U.S. PATENT DOCUMENTS

| | | | | |
|---|---|---|---|---|
| 3,989,017 A | * | 11/1976 | Reece | 123/536 |
| 4,124,003 A | * | 11/1978 | Abe et al. | 123/536 |
| 5,243,950 A | | 9/1993 | Dalupan | |
| 5,829,419 A | * | 11/1998 | Sadkin et al. | 123/538 |
| 5,992,397 A | | 11/1999 | Hideaki et al. | |
| 6,263,865 B1 | * | 7/2001 | Koyama et al. | 123/536 |

* cited by examiner

*Primary Examiner*—Marguerite McMahon
(74) *Attorney, Agent, or Firm*—Sheldon & Mak

(57) ABSTRACT

Apparatus for improving combustion in internal combustion power plants includes a gas vapor treatment chamber for receiving fuel tank and positive crankcase vapors, an emitter for introducing electrons to dissociate ions of the vapors, the reformed vapors being mixed with air passing into a combustion chamber. The reformed vapors can be allowed to enter an air induction system; alternatively, reformation of the vapors can be downstream of mixing of the vapors with air passing in the induction system. Also disclosed is a method for improving the efficiency and/or emissions performance of such power plants.

9 Claims, 2 Drawing Sheets

METHOD AND APPARATUS FOR REFORMING GAS VAPORS OF AN INTERNAL COMBUSTION ENGINE

BACKGROUND

The present invention relates generally to enhancement of internal combustion engine performance and more specifically to a method and apparatus for reforming vented out gases, to produce ionized hydrocarbon gas vapors, adapted to be fed back to the combustion chamber of the engine to enhance its combustion performance.

In an internal combustion engine, leakage of hydrocarbon and hydrogen gas vapors occurs during the combustion process. These gas vapors, which are less dense and partially positive, escape between the engine cylinders and enter the oil crank case or blowby, and also due to the rise in temperature these hydrocarbon gas vapors, vent out of the fuel tank. Such occurrence, which normally happens during combustion, results in fuel wastage. Furthermore, air and fuel mixture being fed in the combustion chamber is normally less potent and is not completely enriched such that unburned fuel is discharged to the exhaust manifold, and carbon deposits builds up in the cylinder head. Such drawbacks lead to poor engine performance, excessive smoke emission that causes pollution and shortens the life of the engine.

To solve these problems, numerous methods, processes, and devices have been introduced with the main purpose of attaining a highly efficient engine devoid of the aforesaid drawbacks of the engines being used at present. Some of these devices or apparatus include the utilization of chemical solutions to be mixed with the air and fuel mixture to give an additional boost to the combustion process. This chemical solution contained in a chamber is injected with air such that bubble effects will occur, thereby producing gas vapors which are then mixed with the fuel and air mixture being introduced in the combustion chamber. Although the aforesaid method appears to have some advantages in enhancing the engine performance, numerous drawbacks have been observed in that the liquid enters the combustion chamber ?in case? Of splashes occurring in the chamber due to engine movement. Since this liquid solution is not highly potent, it causes detonation during combustion and corrodes the engine cylinder which subsequently results in total breakdown of the engine. Also, introduction of other additional substances or solutions other than the suited fuel for the engine can severely damage the cylinder lining in the long run since its design is particular suited for conventional fuels being used at present, such as gasoline or diesel.

Furthermore, reduction of fuel consumption is necessary, not only in the light of economic gain, but also for the prevention of pollution and global warming. In improving the engine combustion, reforming of hydrocarbon fuel by radiation is being conventionally utilized whereby the high molecular compound is reformed by using the emanation action of radiant rays. However, it appears that no successful developments regarding this matter are achieved. The reason appears to be due to the absence of an effective technique to stabilize the radioactive rays which is too complicated, the safety concerns with regard to radioactivity high level and the difficulty of degradation of hydrocarbon molecules without cross linking.

Thus there is a need for a system, device or method that can remedy the above drawbacks of the prior art, to provide an apparatus having means which can effectively reform vented out gas vapors from positive crankcase and fuel tank vents into highly potent hydrocarbon gas vapors which can be mixed to the air and fuel mixture to enhance the combustion process of the engine, which can reduce fuel consumption, which can prevent excessive engine smoke emission thus minimizing air pollution, and which can eliminate carbon deposits in engine cylinders and prevent detonation.

SUMMARY

The present invention meets this need by providing. In one aspect of the invention, an apparatus for reforming gas vapors of an internal combustion engine power plant having an air induction system, a combustion chamber, and positive crankcase and fuel tank vents associated therewith, includes a gas vapor treatment chamber for reforming gas vapors coming from the positive crankcase and fuel tank vents, and feeding the reformed vapors to the combustion chamber; and an emitter for introducing electrons within the treatment chamber to produce dissociation of ions, thereby reforming the gas vapors. The emitter can be an electronic emitter having a capacity of between approximately 10 Kv and approximately 40 Kv of electromotive force. The gas vapor treatment chamber can have a gas vapor intake for connection to the positive crankcase and fuel tank vents of the power plant, and a gas vapor discharge port being in communication with the air induction system of the internal combustion engine.

The gas vapor treatment chamber can form a main passage for receiving intake air together with gas vapor from the positive crankcase and fuel tank vents from a portion of the air intake system, the air and vapors as reformed by the emitter to be passed to the combustion chamber.

In another aspect of the invention, a method for improving combustion by reforming gas vapors of an internal combustion engine power plant having an air induction system, a combustion chamber, and positive crankcase and fuel tank vents associated therewith, the method comprising the steps of: recovering vented out gas vapors from the positive crankcase and fuel tank vents of the power plant; reforming the recovered vapors through introduction of electrons thereto, thereby dissociating ions of the vapors; and passing the reformed gas vapors with the air and fuel being fed to the combustion chamber of the internal combustion engine, thereby improving the combustion efficiency and/or emissions performance of the power plant. The reforming can include producing radical hydrocarbon gas vapors. The reforming can include introducing electrons by applying from approximately 10 Kv and approximately 40 Kv electromotive force to an electronic emitter.

The method can further include, subsequent to the reforming, allowing the reformed vapors to enter the air induction system. Alternatively, the method can further include, prior to the reforming, allowing the gas vapors to mix with air within the air induction system prior to the reforming.

DRAWINGS

These and other features, aspects, and advantages of the present invention will become better understood with reference to the following description, appended claims, and accompanying drawings, where:

DESCRIPTION

Figure 3:
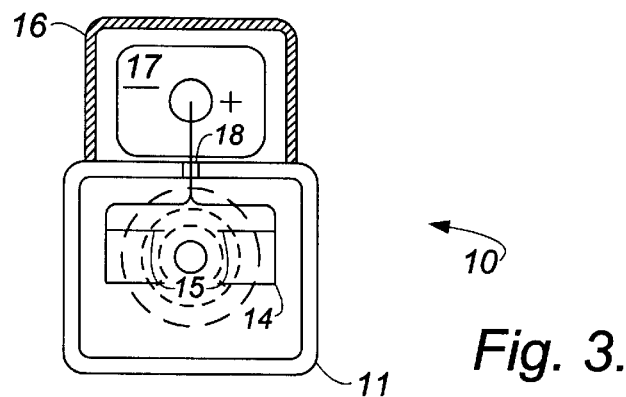
FIG. 3 is a longitudinal cross-sectional view of the apparatus of FIG. 1.
Figure 2:
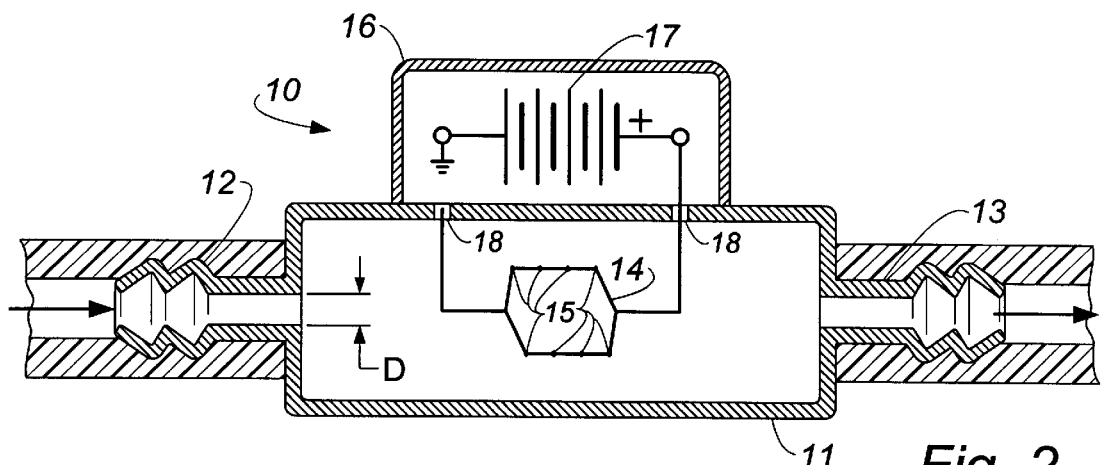
FIG. 2 is lateral a cross-sectional view of a preferred embodiment of the apparatus of FIG. 1 with a schematic representation of gas vapor reforming means thereof.
Figure 1:
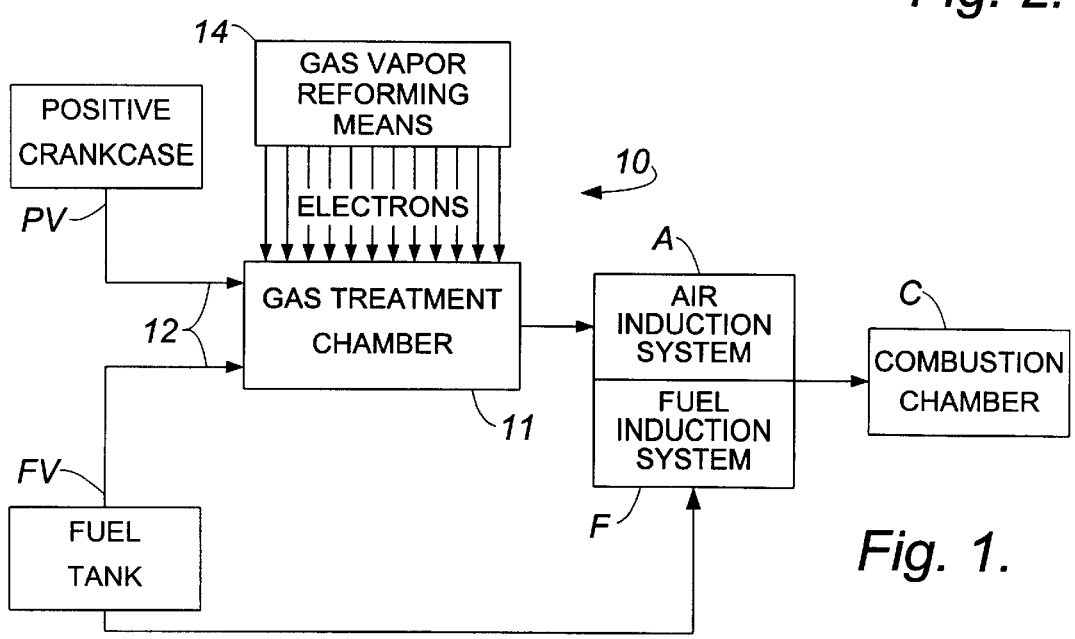
FIG. 1 is a schematic diagram showing the gas vapor flow in an internal combustion power plant incorporating apparatus according to the present invention.

The present invention is directed to a system for reforming vapors associated with internal combustion power plants that is particularly effective for enhancing the combustion process, reducing fuel consumption, preventing excessive engine emission of smoke and other air pollutants, eliminating carbon deposits, and/or preventing detonation. With reference to FIGS. 1–3 of the drawings, an apparatus 10 for reforming gas vapors is adapted to be in communication with the positive crankcase ventilation P, fuel tank vent F and air induction system A of an internal combustion engine. The apparatus 10 includes a treatment chamber 11 having a gas vapor intake port 12 and reformed gas vapor discharge port 13, and a gas vapor reforming means 14 in communication with the treatment chamber 11. The gas vapor intake port 12 is adapted to be connected to the positive crankcase ventilation P and the fuel tank vent F, and the gas discharge port 13 is adapted to be connected to the air induction system A of the internal combustion engine. The gas vapor reforming means 14 is preferably an electronic emitter (referred to hereafter as the emitter 14) having the capacity of emitting high potential at the tip of one or more whiskers or needles 15 through passage of a high electromotive force derived from the low voltage electrical system of the engine. The emitter 14 typically operates at 10 kv to 40 kv of electromotive force, being fed from a voltage multiplier unit 16 that is supported adjacent the chamber 11 as shown in FIG. 2. Thus a large quantity of electrons exhibit tunneling at the tip of one or more needles or whiskers 15 of the emitter 14, the electrons being utilized for reforming the gas vapors recovered in the fuel tank and positive crankcase ventilation (PCV) of the engine.

In the exemplary configuration of FIGS. 2 and 3, the voltage multiplier unit 16 is mounted in abutting relation to the treatment chamber 11, it being understood that other locations are also contemplated within the scope of the present invention. Also, the specific details regarding the circuit of the voltage multiplier unit 15, symbolically shown as including a (high-voltage) battery 17 having its negative terminal grounded. Similarly, construction details of the emitter 14 are known to those having skill in the art of gas ionization. In FIGS. 2 and 3, the emitter 14 is shown having conductive elements thereof (one of which is connected to the "battery" 17) being supported by a pair of insulative elements 18 that are imbedded in the treatment chamber 11. Spaced pluralities of the needles 15 project inwardly from opposite sides of the chamber. Of course, other arrangements are contemplated. For example, any number of the needles, extending substantially fully or part-way across the chamber 11, and they can overlap or be spaced-apart laterally, either in-line or staggered.

The method as herein disclosed includes recovering the vented out hydrocarbon gas vapors from the fuel tank and hydrocarbons including radical hydrogen gas vapors from the positive crankcase ventilation (PCV) of an internal combustion power plant. These less dense and partially positive gas vapors are made to pass through the treatment chamber 11 and bombarding them with a massive amount of electrons (mass spectra) formed by operating the emitter 14 with from approximately 10 kv to approximately 40 kv of electric voltage.

Dissociation of ions occurs resulting in negatively and positively charged ions composing the reformed hydrocarbon gas vapor. These reformed hydrocarbon gas vapors are highly potent and are then oxidized by allowing them to mix with the air/fuel mixture in the air induction system A of the engine, which is then introduced in the combustion chamber. Since the reformed hydrocarbon gas vapors are highly potent, combustion is greatly enhanced, thus resulting in improved engine efficiency performance and increased engine power. Furthermore, fuel consumption is greatly reduced and smoke emission, which is highly detrimental to the environment, is eliminated. As described below, the advantages of the present invention have been confirmed by testing with use in both gasoline and diesel engine power plants.

An experimental prototype of the apparatus 10 has been built as described above and tested on a 1966 Proton Wira 1300 cc automobile to verify improved combustion efficiency, the results being presented in Table 1 (before installation of the apparatus 10) and Table 2 (after installation).

TABLE 1

Combustion Efficiency Before Installation

| Date | Initial Meter Reading | Final Meter Reading | Driving Distance | Amount of Fuel Consumed | Driving distance per Liter of Fuel |
|---|---|---|---|---|---|
| 12/1 | 81842 | 83134 | 292 | 22.42 | 13.03 km/l |
| 3/7 | 85605 | 85751 | 146 | 11.23 | 13 km/l |
| 3/10 | 85914 | 86039 | 121 | 9.31 | 13 km/l |

TABLE 2

Combustion Efficiency After Installation

| Date | Initial Meter Reading | Final Meter Reading | Driving Distance (km) | Amount (l) of Fuel Consumed | Driving distance per Liter of Fuel |
|---|---|---|---|---|---|
| 12/2 | 82134 | 83134 | 289 | 16.5 | 17.5 km/l |
| 3/7 | 85374 | 85751 | 231 | 13.9 | 16.6 km/l |
| 3/10 | 85914 | 86039 | 125 | 7.8 | 16.0 km/l |

The results show improvements of 34.3%, 27.7%, and 23.1%, respectively. Similar tests were performed on a 1987 Volvo 240GL (2.3 L), and a Mitsubishi Van Diesel (2.7 L), the results being presented in Tables 3 and 4.

TABLE 3

Combustion Efficiency - 1987 Volvo

| | Pre-Installation | Post-Installation | Post-Installation |
|---|---|---|---|
| Date | 9/24/01 | 9/26/01 | 9/26/01 |
| Time | 13:00–16:05 | 13:00–16:00 | 13:00–16:10 |
| Duration | 3 hr 05 min | 3 hr 00 min | 3 hr 10 min |
| Distance (Mi) | 186 | 187 | 188 |
| Fuel (gal.) | 7.59 | 6.66 | 6.37 |
| MPG | 24.50 | 28.07 | 29.51 |
| Saving % | | 14.6 | 20.4 |

TABLE 4

Combustion Efficiency - 1992 Mitsubishi

|  | Pre-Installation | Post-Installation | Post-Installation |
|---|---|---|---|
| Date | 6/15/01 | 6/16/01 | 6/17/01 |
| Time | 14:00–16:40 | 14:00–16:44 | 14:00–16:44 |
| Duration | 2 hr 40 min | 2 hr 44 min | 2 hr 42 min |
| Distance (Km) | 260 | 262 | 260 |
| Fuel (Liter) | 24.76 | 20.15 | 20.03 |
| Km/Liter | 24.50 | 28.07 | 29.51 |
| Saving % |  | 18.2 | 18.0 |

Further tests were performed to measure carbon particulate emissions, on the 1992 Mitsubishi diesel, the tests on the Mitsubishi, presented in Table 5, being done in the Philippines and are expressed in HSU.

TABLE 5

Carbon Particulate Emissions - 1992 Mitsubishi

|  | Pre-Installation | Post-Installation |
|---|---|---|
| Date | 6/4/01 | 6/5/01 |
| First (HSU) | 72 | 22 |
| Second (HSU) | 58 | 20 |
| Third (HSU) | 59 | 18 |
| Average (HSU) | 63 | 26 |
| Result | Fail | Pass |

Additional emissions tests were done on the 1987 Volvo, on Sep. 5, 2001; a 1997 Toyota Celica (2.2 L), Sep. 6, 2001; a 1990 Toyota Previa (2.4 L), on Sep. 9, 2001; and a 1999 GMC Jimmy 4WD (4.3 L), Sep. 20, 2001. These tests, which were to verify reduced levels of harmful hydrocarbon, carbon monoxide, and nitrogen oxide emissions, are presented in Tables 6–12, the tests being done at 15 and 25 mph for all but the Volvo for which results at 15 mph are presented.

TABLE 6

Emission Levels Before and After Installation

| Volvo - 15 mph | HC ppm | CO % | NO ppm |
|---|---|---|---|
| EPA Std. | 121 | 0.76 | 1059 |
| Before Instl. | 120 | 0.40 | 1006 |
| After Instl. | 79 | 0.34 | 165 |
| Improvement | 41 | 0.06 | 841 |
| Reduction % | 34.2 | 15.0 | 83.6 |

TABLE 7

Emission Levels Before and After Installation

| Celica - 15 mph | HC ppm | CO % | NO ppm |
|---|---|---|---|
| EPA Std. | 89 | 0.53 | 1011 |
| Before Instl. | 29 | 0.05 | 29 |
| After Instl. | 3 | 0.04 | 6 |
| Improvement | 26 | 0.01 | 23 |
| Reduction % | 90.0 | 20.0 | 73.9 |

TABLE 8

Emission Levels Before and After Installation

| Previa - 15 mph | HC ppm | CO % | NO ppm |
|---|---|---|---|
| EPA Std. | 121 | 0.76 | 1059 |
| Before Instl. | 36 | 0.10 | 42 |
| After Instl. | 9 | 0.12 | 41 |
| Improvement | 26 | 0.01 | 23 |
| Reduction % | 90.0 | 20.0 | 73.9 |

TABLE 9

Emission Levels Before and After Installation

| GMC - 15 mph | HC ppm | CO % | NO ppm |
|---|---|---|---|
| EPA Std. | 54 | 0.69 | 745 |
| Before Instl. | 52 | 0.11 | 41 |
| After Instl. | 13 | 0.01 | 9 |
| Improvement | 39 | 0.10 | 32 |
| Reduction % | 75.0 | 85.6 | 78.0 |

TABLE 10

Emission Levels Before and After Installation

| Celica - 25 mph | HC ppm | CO % | NO ppm |
|---|---|---|---|
| EPA std. | 54 | 0.51 | 871 |
| Before Instl. | 8 | 0.02 | 14 |
| After Instl. | 3 | 0.01 | 0 |
| Improvement | 5 | 0.00 | 14 |
| Reduction % | 62.5 | 0* | 78.0 |

TABLE 11

Emission Levels Before and After Installation

| Previa - 25 mph | HC ppm | CO % | NO ppm |
|---|---|---|---|
| EPA Std. | 121 | 0.76 | 1059 |
| Before Instl. | 29 | 0.05 | 29 |
| After Instl. | 3 | 0.04 | 6 |
| Improvement | 26 | 0.01 | 23 |
| Reduction % | 90.0 | 20.0 | 73.9 |

TABLE 12

Emission Levels Before and After Installation

| GMC - 25 mph | HC ppm | CO % | NO ppm |
|---|---|---|---|
| EPA std. | 38 | 0.83 | 780 |
| Before Instl. | 25 | 0.00 | 0 |
| After Instl. | 11 | 0.00 | 0 |
| Improvement | 14 | 0.00 | 0 |
| Reduction % | 56.0 | 0* | 0* |

*Apparently limited by instrumentation.

The results of these emissions tests show significant reductions in hydrocarbon emissions, and in most cases a dramatic reduction in both carbon monoxide and nitrogen oxide level on each of the vehicles. The tests show dramatic reductions in the hydrocarbon and carbon monoxide emissions in some cases as well.

Figure 5:
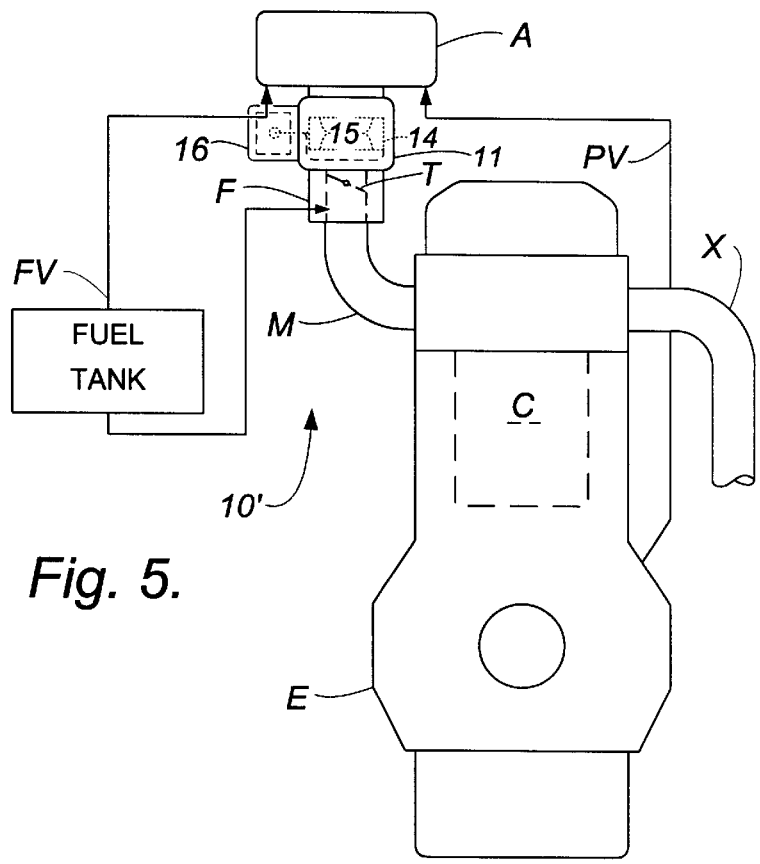
FIG. 5 is a pictorial diagram view of the apparatus of FIG. 4.
Figure 4:
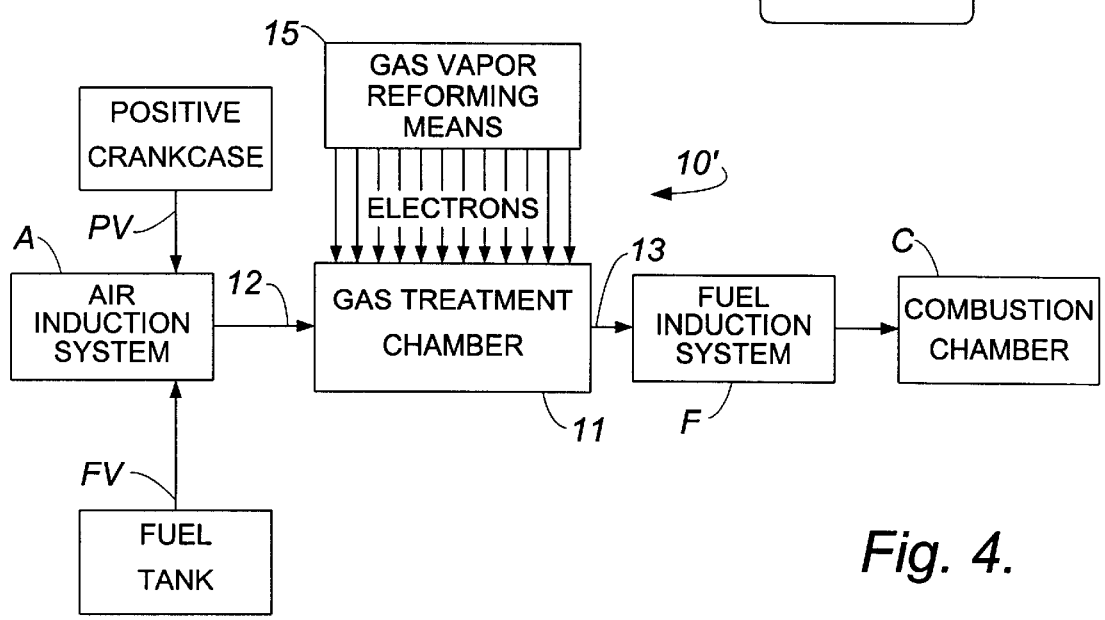
FIG. 4 is a schematic diagram showing an alternative arrangement of the apparatus of FIG. 1 in the power plant.

With further reference to FIGS. 3 and 4, an alternative configuration of the apparatus, designated 10', has the treatment chamber 11 downstream of the induction system A of an engine E, the fuel vent FV and the crankcase vent PV being connected to the induction system A in a conventional manner. In the exemplary configuration of FIG. 5, the treatment chamber 11 forms a main passage for air within the induction system A, and is mounted upstream of a fuel-injection body F, the body F having a throttle T and being fluid-connected to an intake manifold M of the engine E. It will be understood that the body F can be a carburetor body, and that other forms of fuel injection such as port-injection and direct-injection are contemplated within the scope of the present invention.

An experimental prototype of the apparatus 10' has been built, and on Oct. 30, 2001, this prototype was tested on the 1987 Volvo 240GL to verify reduced levels of harmful hydrocarbon, carbon monoxide, and nitrogen oxide emissions, the results being presented in Table 13

TABLE 3

Emission Levels Before and After Installation

| Volvo - 15 mph | HC ppm | CO % | NO ppm |
| --- | --- | --- | --- |
| EPA Std. | 121 | 0.76 | 1059 |
| Before Instl. | 112 | 0.42 | 1034 |
| After Instl. | 71 | 0.25 | 119 |
| Improvement | 41 | 0.17 | 915 |
| Reduction % | 36.6 | 40.5 | 88.5 |

The results of the emissions tests show similar improvement in the emissions levels as compared with the apparatus 10 of FIGS. 1–3. In most of the above-described tests, the emitter 14 was provided with four of the needles 15, the diameter D of the ports 12 and 13 being approximately 10 or 12 mm.

Although the present invention has been described in considerable detail with reference to certain preferred versions, thereof, other versions are possible. For example, the emitter 14 can include a radioactive material. Therefore, the spirit and scope of the appended claims should not necessarily be limited to the description of the preferred versions contained herein.

What is claimed is:

1. An apparatus for reforming gas vapors of an internal combustion engine power plant having an air induction system, a combustion chamber, and positive crankcase and fuel tank vents associated therewith, the apparatus comprising:

(a) a gas vapor treatment chamber for reforming gas vapors coming from the positive crankcase and fuel tank vents, and feeding the reformed vapors to the combustion chamber; and (b) an emitter for introducing electrons within the treatment chamber to produce dissociation of ions, thereby reforming the gas vapors.

2. The apparatus of claim 1, wherein the emitter is an electronic emitter having a capacity of between approximately 10 Kv and approximately 40 Kv of electromotive force.

3. The apparatus of claim 1, wherein the gas vapor treatment chamber has a gas vapor intake for connection to the positive crankcase and fuel tank vents of the power plant, and a gas vapor discharge port being in communication with the air induction system of the internal combustion engine.

4. The apparatus of claim 1, wherein the gas vapor treatment chamber forms a main passage for receiving intake air together with gas vapor from the positive crankcase and fuel tank vents from a portion of the air intake system, the air and vapors as reformed by the emitter to be passed to the combustion chamber.

5. A method for improving combustion by reforming gas vapors of an internal combustion engine power plant having an air induction system, a combustion chamber, and positive crankcase and fuel tank vents associated therewith, the method comprising the steps of:

(a) recovering vented out gas vapors from the positive crankcase and fuel tank vents of the power plant;

(b) reforming the recovered vapors through introduction of electrons thereto, thereby dissociating ions of the vapors; and (c) passing the reformed gas vapors with the air and fuel being fed to the combustion chamber of the internal combustion engine, thereby improving the combustion efficiency and/or emissions performance of the power plant.

6. The method of claim 5, wherein the reforming comprises producing radical hydrocarbon gas vapors.

7. The method of claim 5, wherein the reforming comprises introducing electrons by applying from approximately 10 Kv and approximately 40 Kv electromotive force to an electronic emitter.

8. The method of claim 5, further comprising, subsequent to the reforming, allowing the reformed vapors to enter the air induction system.

9. The method of claim 5, further comprising, prior to the reforming, allowing the gas vapors to mix with air within the air induction system prior to the reforming.

* * * * *